US010572756B2

United States Patent
Csèfalvay

(10) Patent No.: US 10,572,756 B2
(45) Date of Patent: Feb. 25, 2020

(54) PERFORMING OBJECT DETECTION IN AN IMAGE

(71) Applicant: Imagination Technologies Limited, Kings Langley (GB)

(72) Inventor: Szabolcs Csèfalvay, Kings Langley (GB)

(73) Assignee: Imagination Technologies Limited, Kings Langley (GB)

( * ) Notice: Subject to any disclaimer, the term of this patent is extended or adjusted under 35 U.S.C. 154(b) by 47 days.

(21) Appl. No.: 15/843,979

(22) Filed: Dec. 15, 2017

(65) Prior Publication Data

US 2018/0107890 A1 Apr. 19, 2018

Related U.S. Application Data

(63) Continuation of application No. 14/966,288, filed on Dec. 11, 2015, now Pat. No. 9,875,420.

(30) Foreign Application Priority Data

Dec. 11, 2014 (GB) .................................. 1422066.9

(51) Int. Cl.
*G06K 9/00* (2006.01)
*G06K 9/32* (2006.01)
(Continued)

(52) U.S. Cl.
CPC ....... *G06K 9/3241* (2013.01); *G06K 9/00248* (2013.01); *G06K 9/00973* (2013.01);
(Continued)

(58) Field of Classification Search
CPC .... G06F 9/3836; G06F 9/3867; G06F 9/3885; G06F 9/3887
See application file for complete search history.

(56) References Cited

U.S. PATENT DOCUMENTS 6,128,642 A * 10/2000 Doraswamy ............ G06F 9/505
709/201
6,748,593 B1 * 6/2004 Brenner ................ G06F 9/5083
709/223
(Continued)

OTHER PUBLICATIONS

Nguyen, Tan, et al. "A software-based dynamic-warp scheduling approach for load-balancing the Viola—Jones face detection algorithm on GPUs." Journal of Parallel and Distributed Computing 73.5 (2013): 677-685.*
(Continued)

*Primary Examiner* — Avinash Yentrapati
(74) *Attorney, Agent, or Firm* — Potomac Law Group, PLLC; Vincent M DeLuca

(57) ABSTRACT

A single-instruction, multiple data processor performs object detection in an image by testing for a plurality of object features in a plurality of image regions, the processor comprising: a set of computation units operable to execute a plurality of classifier sequences in parallel, each classifier sequence comprising a plurality of classifier routines, and each classifier routine comprising identical instructions to the other classifier routines in each of the plurality of classifier sequences; wherein each computation unit is configured to independently maintain data identifying an image region and a feature under test on that computation unit, and each classifier routine is arranged to access the data, test the identified feature against the identified image region and update the data such that the computation units are operable to concurrently test different features against different image regions.

18 Claims, 5 Drawing Sheets

(51) Int. Cl.
*G06K 9/66* (2006.01)
*G06K 9/62* (2006.01)
*G06T 7/11* (2017.01)

(52) U.S. Cl.
CPC ....... *G06K 9/00993* (2013.01); *G06K 9/6257* (2013.01); *G06K 9/66* (2013.01); *G06T 7/11* (2017.01); *G06T 2207/10016* (2013.01)

(56) References Cited

U.S. PATENT DOCUMENTS

| | | | | |
|---|---|---|---|---|
| 8,649,612 | B1* | 2/2014 | Brunner | G06K 9/6292 382/118 |
| 9,633,249 | B2* | 4/2017 | Csefalvay | G06T 7/90 |
| 2003/0212731 | A1* | 11/2003 | Brenner | G06F 9/5088 718/105 |
| 2005/0041031 | A1* | 2/2005 | Diard | G06T 15/005 345/505 |
| 2006/0059494 | A1* | 3/2006 | Wexler | G06F 9/505 718/105 |
| 2009/0063885 | A1* | 3/2009 | Arimilli | G06F 9/5038 713/375 |
| 2010/0095302 | A1* | 4/2010 | Kato | G06F 9/5066 718/104 |
| 2011/0131430 | A1* | 6/2011 | Krishnamurthy | G06F 1/3203 713/320 |
| 2012/0320070 | A1* | 12/2012 | Arvo | G06F 9/5033 345/522 |
| 2013/0247067 | A1* | 9/2013 | Schmit | G06F 9/4881 718/105 |
| 2015/0089156 | A1* | 3/2015 | Clohset | G06T 1/60 711/141 |

OTHER PUBLICATIONS

Jia, Haipeng, et al. "Accelerating viola Jones facce detection algorithm on gpus." 2012 IEEE 14th International Conference on High Performance Computing and Communication & 2012 IEEE 9th International Conference on Embedded Software and Systems. IEEE, 2012.*

Hwu, "GPU Computing Gems" 2011 NVIDIA Corporation and Wen-mei W. Hwu. Published by Elsevier Inc. pp. 23-889.

Meng et al., "CUDA-based real-time face recognition system." Digital Information and Communication Technology and its Applications (DICTAP), 2014 Fourth International Conference on. IEEE, 2014.

Verry, "The future of AMD's Fusion APUs: Kaveri will fully share memory between CPU and GPU" http://www.extremetech.com/computing/130939-the-future-of-amds-fusion-apus-kavarl-will-fully-share-memory-between-cpu-and-gpu.

Viola et al., "Robust Real-Time Face Detection" International Journal of Computer Vision 57(2), 137-154, 2004; 2004 Kluwer Academic Publishers. Manufactured in The Netherlands.

Nguyen et al., "A Software-based dynamic-warp scheduling approach for load-balancing the Viola-Jones face detection algorithm on GPUs," Journal of Parallel and Distributed Computing, Elsevier, Amsterdam, NL, vol. 73, No. 5, Jan. 29, 2013, pp. 677-685.

Jia et al., "Accelerating Viola-Jones face detection algorithm on GPUs," High Performance Computing and Communications, 2012 IEEE 9th International Conference on Embedded Software and Systems (HPCC-ICESS) Jun. 25, 2012, pp. 396-403.

Bilaniuk et al., "Fast LBP Face Detection on Low-Power SIMD Architectures," 2014 IEEE Conference on Computer Vision and Pattern Recognition Workshops, Jun. 23, 2014; pp. 630-636.

Hefenbrock et al., "Accelerating Viola-Jones Face Detection to FPGA-Level Using GPUs,"18th Annual IEEE International Symposium onField-Programmable Custom Computing Machines (FCCM), IEEE Piscataway, NJ May 2, 2010, pp. 11-18.

* cited by examiner

Fn = Feature n
SWn = Subwindow n

PERFORMING OBJECT DETECTION IN AN IMAGE

BACKGROUND OF THE INVENTION

This invention relates to a SIMD (Single Instruction Multiple Data) processor and method for performing object detection in an image, such as for example a face.

Many modern methods for performing automatic face detection are based on the Viola-Jones object detection framework which is described in the paper by P. Viola and M. Jones: "Robust realtime face detection", International Journal of Computer Vision, vol. 57, no. 2, pp. 137-154, 2004. The Viola-Jones framework operates on a set of image regions or "subwindows" defined for an image, each subwindow having a different location, scale or angle of rotation within the image so as to allow faces at different locations, or of different sizes and angles of rotation to be detected. A cascaded set of binary classifiers operates on each subwindow so as to detect whether the subwindow is likely to bound a face in the image. Each binary classifier is a test performed on a subwindow in order to determine whether the subwindow satisfies one or more simple visual features (often referred to as "Haar-like features"). If a subwindow satisfies the one or more simple visual features, the binary classifier passes the subwindow and moves onto the next binary classifier in the cascade. When all of the binary classifiers of a cascade pass a subwindow, that subwindow becomes a candidate for a face in the image being searched. If any of the binary classifiers in a cascade reject a subwindow, then no further processing is performed on that subwindow, the cascade terminates and cascade processing begins again on the next subwindow.

Four visual features 201-204 which are typically used in the Viola-Jones framework are shown in FIG. 2. Each of the features 201 to 204 shown in FIG. 2 visually represent how to process the pixel values of a subwindow in order to test a subwindow. For example, feature 201 might represent a component of a first binary classifier in a cascade of classifiers and is calculated by subtracting the sum of the pixel values of the subwindow lying in the shaded area of the feature (the right-hand side of the subwindow) from the sum of the pixel values of the subwindow lying in the unshaded area of the feature (the left-hand side of the subwindow). If the feature evaluates to a value which exceeds a predefined threshold (typically established by training the face detector on test images), the subwindow is deemed to satisfy the visual feature and the binary classifier passes the subwindow. Typically the binary classifiers operate on subwindows of an image which has been processed so as to represent only luminance or brightness information (e.g. the pixel values can be luma values). In this manner, the binary classifiers of a cascade act so as to identify particular patterns of contrast in an image which are indicative of facial features.

In order to improve the performance of a face detection system, the binary classifier operations performed according to the Viola-Jones object detection framework can be performed in parallel at a graphics processing unit (GPU) by allocating groups of threads to the GPU. However, this approach can lead to the parallel processing elements of the GPU being idle for a significant proportion of time. This is because the parallel processing of a group of threads will generally not complete until the processing of every one of its threads has completed and any given thread operating on a subwindow could terminate almost immediately if the subwindow fails the first binary classifier of the cascade, or it could complete processing of all of the binary classifiers of the cascade should the subwindow represent a face candidate. This underutilisation of processing resources presents a hurdle to performing face detection in real-time using the Viola-Jones framework, especially on mobile and low-power platforms.

Previous efforts to address this issue have attempted break up the performance of binary classifiers into stages, such as the Nvidia CUDA implementation described at pages 534-541 of "GPU Computing Gems" by Wen-mei W. Hwu, Elsevier Inc., 2011. However, this only partly addresses the issue, introduces an additional overhead for compacting data between stages, and has the disadvantage that it is inefficient during the early stages of processing.

SUMMARY OF THE INVENTION

According to a first aspect of the present invention there is provided a single-instruction, multiple data processor for performing object detection in an image by testing for a plurality of object features in a plurality of image regions, the processing unit comprising:
  a set of computation units operable to execute a plurality of classifier sequences in parallel, each classifier sequence comprising a plurality of classifier routines, and each classifier routine comprising identical instructions to the other classifier routines in each of the plurality of classifier sequences;
  wherein each computation unit is configured to independently maintain data identifying an image region and a feature under test on that computation unit, and each classifier routine is arranged to access the data, test the identified feature against the identified image region and update the data such that the computation units are operable to concurrently test different features against different image regions.

Each classifier sequence may be configured to perform a sequence of tests for object features in an image region, each classifier routine of the classifier sequence being configured to perform a test of the sequence.

Each classifier routine may be configured to pass or fail an image region and comprising instructions configured to:
  on passing an image region, update the data maintained for the computation unit at which the classifier routine is executing so as to cause the next classifier routine in the classifier sequence to test the next feature against the same image region;
  on failing an image region, update the data maintained for the computation unit at which the classifier routine is executing so as to cause the next classifier routine in the classifier sequence to test the first feature against a next image region.

The single-instruction, multiple data processor may further comprise a memory accessible to the set of computation units and arranged to store an index representing an extent of search through the plurality of image regions and each classifier routine comprising instructions configured to, on failing an image region, update the data maintained for the computation unit at which the classifier routine is executing by atomically incrementing the index so as to update the extent of search and cause an identifier of the next image region to be returned to the classifier routine.

Each classifier routine being configured to use its data identifying an image region to lookup data from that identified image region in the image in which object detection is being performed.

Each classifier routine of a classifier sequence being a single routine arranged to execute iteratively at its computation unit so as to test the identified feature against the identified region and update the data.

The single-instruction, multiple data processor may further comprise a further set of computation units operable to execute the plurality of classifier sequences, wherein the set of computation units forms a first computation group and the further set of computation units forms a second computation group, and wherein the plurality of image regions are divided into a plurality of subsets of image regions, and each of the first and second computation group is allocated a different one of the subsets of image regions to test.

The single-instruction, multiple data processor may further comprise a global memory storing a global index representing an extent of search by the first and second computation groups through the plurality of subsets of image regions; wherein each classifier routine comprises instructions configured to, on exhausting the subset of image regions for its associated computation group, cause a new subset of image regions to be allocated to the associated computation group in dependence on the global index.

Each classifier routine comprising instructions configured to cause the global index to allocate a new subset of image regions to the associated computation group by atomically updating the global index so as to update the extent of search through the plurality of subsets of image regions, and cause an identifier of the next subset of image regions to be returned to the classifier routine.

The index may be updated on the allocation of the new subset of image regions to the first computation group.

The memory of the first computation group may be accessible to that computation group but not to other computation groups.

Each image region differing from other image regions in terms of one or more of its position, size and orientation in the frame.

Each object feature being a Haar-like feature and each classifier routine being configured to determine whether the feature meets a predefined threshold.

Machine readable code may be provided defining the single-instruction, multiple data processing unit. A machine readable storage medium having encoded thereon non-transitory machine readable code may be provided defining the single-instruction, multiple data processing unit.

According to a second aspect of the present invention there is provided a method for performing object detection in an image at a single-instruction, multiple data processor having a set of computation units arranged to execute a plurality of classifier sequences in parallel, each classifier sequence comprising a plurality of classifier routines having identical instructions to the other classifier routines in each of the plurality of classifier sequences, and the method comprising:
  executing a classifier routine of each sequence in parallel at each of the set of computation units so as to test for a plurality of object features in a plurality of image regions;
  each classifier routine:
    independently maintaining data identifying an image region and a feature under test by the classifier routine;
    accessing the data;
    testing the identified feature against the identified image region; and
    updating the data such that the computation units are operable to concurrently test different features against different image regions.

Each classifier routine, on testing an identified feature against an identified image region, may:
  pass the image region and update its data identifying the image region and the feature under test so as to cause the next classifier routine in the classifier sequence to test the next feature against the same image region; or
  fail the image region and update the data identifying the image region and the feature under test so as to cause the next classifier routine in the classifier sequence to test the first feature against a next image region.

The method may further comprise maintaining an index representing an extent of search by the set of computation units through the plurality of image regions, and each classifier routine, on failing an image region, updating its data identifying the image region and the feature under test by atomically incrementing the index so as to update the extent of search and cause an identifier of the next image region to be returned to the classifier routine.

Each classifier routine may use its data identifying an image region to lookup data from that identified image region in the image in which object detection is being performed.

The method may comprise iteratively executing each classifier routine at its computation unit so as to test the identified feature against the identified region and update the data.

Each classifier routine may execute at a computation unit of one of a plurality of groups of computation units and the method may further comprise:
  dividing the plurality of image regions into a plurality of subsets of image regions; and
  allocating a different one of the subsets of image regions for testing at each group of computation units.

The method may further comprise:
  maintaining a global index representing an extent of search by the plurality of groups of computation units through the plurality of subsets of image regions; and
  on a classifier routine exhausting the subset of image regions for its associated computation group, causing a new subset of image regions to be allocated to the associated computation group in dependence on the global index.

Each classifier routine may cause a new subset of image regions to be allocated the associated computation group by atomically updating the global index so as to update the extent of search through the plurality of subsets of image regions and cause an identifier of the next subset of image regions to be returned to the classifier routine.

Machine readable code may be provided for implementing the method. A machine readable storage medium having encoded thereon non-transitory machine readable code may be provided for implementing the method.

BRIEF DESCRIPTION OF THE DRAWINGS

The present invention will now be described by way of example with reference to the accompanying drawings, in which.

DETAILED DESCRIPTION

The following description is presented by way of example to enable any person skilled in the art to make and use the invention. The present invention is not limited to the embodiments described herein and various modifications to the disclosed embodiments will be readily apparent to those skilled in the art.

There is provided a single instruction, multiple data (SIMD) processor and method for performing object detection at a SIMD processor. In the examples described herein, the object detection performed is the detection of faces in an image but the principles described herein are not limited to the detection of faces. It will be readily apparent that the same principles can be applied to the detection of other object types in an image (e.g. other parts of the human body, car number plates, and animals, to give just a few examples). The examples set out herein are described with respect to the Viola-Jones framework for performing object detection. It will be appreciated, however, that the principles described herein apply to any object detection system which makes use of a cascade of classifiers in order to identify candidate objects in an image.

Performing object detection using a classifier sequence as described herein comprises testing for one or more object features in the subject image region (also called subwindow hereinafter), the subwindow representing a region of the image in which object detection is to be performed.

Figure 1:
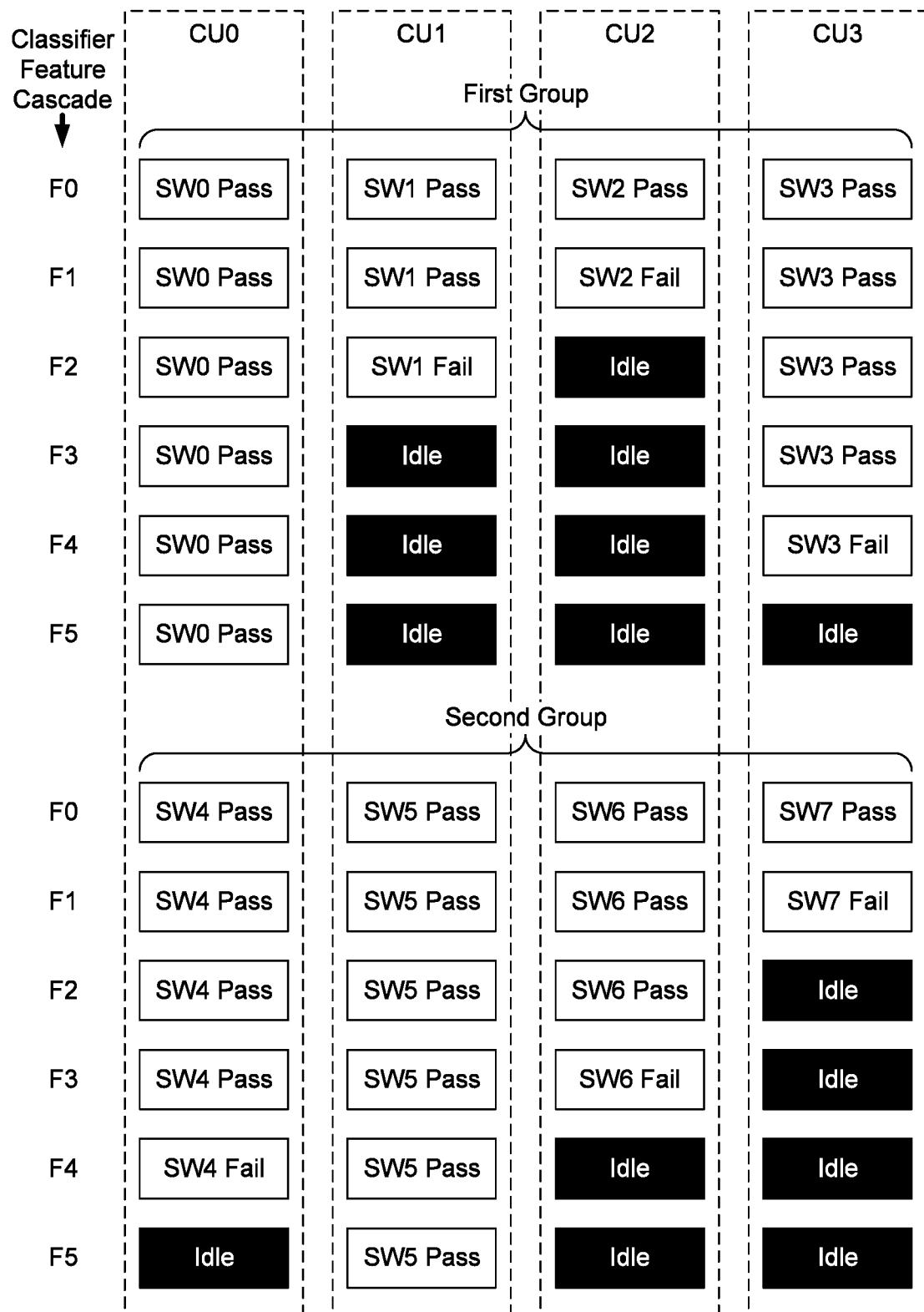
FIG. 1 illustrates the processing of cascades of classifiers at the computation units of a SIMD processor.

By way of context, it is instructive to consider how a SIMD processor performs parallel processing of a classifier sequence for detecting faces in an image in accordance with the Viola-Jones framework. An example of such processing is shown in FIG. 1. In this example, each sequence comprises six stages which test object features F0 to F5 respectively against each subwindow defined for the image. The SIMD processor comprises four computation units each running identical instructions in parallel on different subwindows such that at any given time all of the computation units are evaluating the same feature (or a computation unit can be idle following the termination of its classifier sequence). Typically, there will be a large number of subwindows defined for the subject image. The computation units of the SIMD processor are constrained to perform the same instructions at the same time, with the subwindows being allocated to the computation units CU0 to CU3 in groups of four subwindows at a time for simultaneous processing.

In FIG. 1, the processing of first and second groups of subwindows at computation units CU0 to CU3 are shown. In the first group SW0-SW3 it can be seen that subwindow SW0 passes all of features F0 to F5 of the classifier sequence performed by computation unit CU0. Subwindow SW0 therefore represents a candidate window in which a face may be present. Each of subwindows SW1-SW3 fail a classifier feature test such that the classifier sequence running at its respective computation unit terminates. This leaves those computation units idle whilst computation unit CU0 continues to perform useful work. For example, subwindow SW2 which is processed at computation unit CU2 fails the second classifier feature F1 and is therefore idle while the other computation units perform one or more of features F2-F5.

Only once processing of the first group of subwindows has terminated at all of the computation units can the cycle of instructions configured to perform the classifier sequence begin again. As shown in FIG. 1, a second group of subwindows SW4-SW7 is allocated to the computation units and the classifier sequence is simultaneously performed on each of those subwindows. In the second group, subwindow SW5 passes all of the feature tests F0 to F5, and subwindows SW4, SW6 and SW7 each fail a respective one of the feature tests, such that they terminate before the sequence is completed, leaving the respective computation units CU0, CU2 and CU3 idle during one or more of the instruction sequences relating to feature tests F2 to F5.

In the example shown in FIG. 1, it can be seen that the computation units of the conventional SIMD processor are idle over 30% of the processor time available for processing subwindows SW0 to SW7 of the first and second groups.

Figure 3:
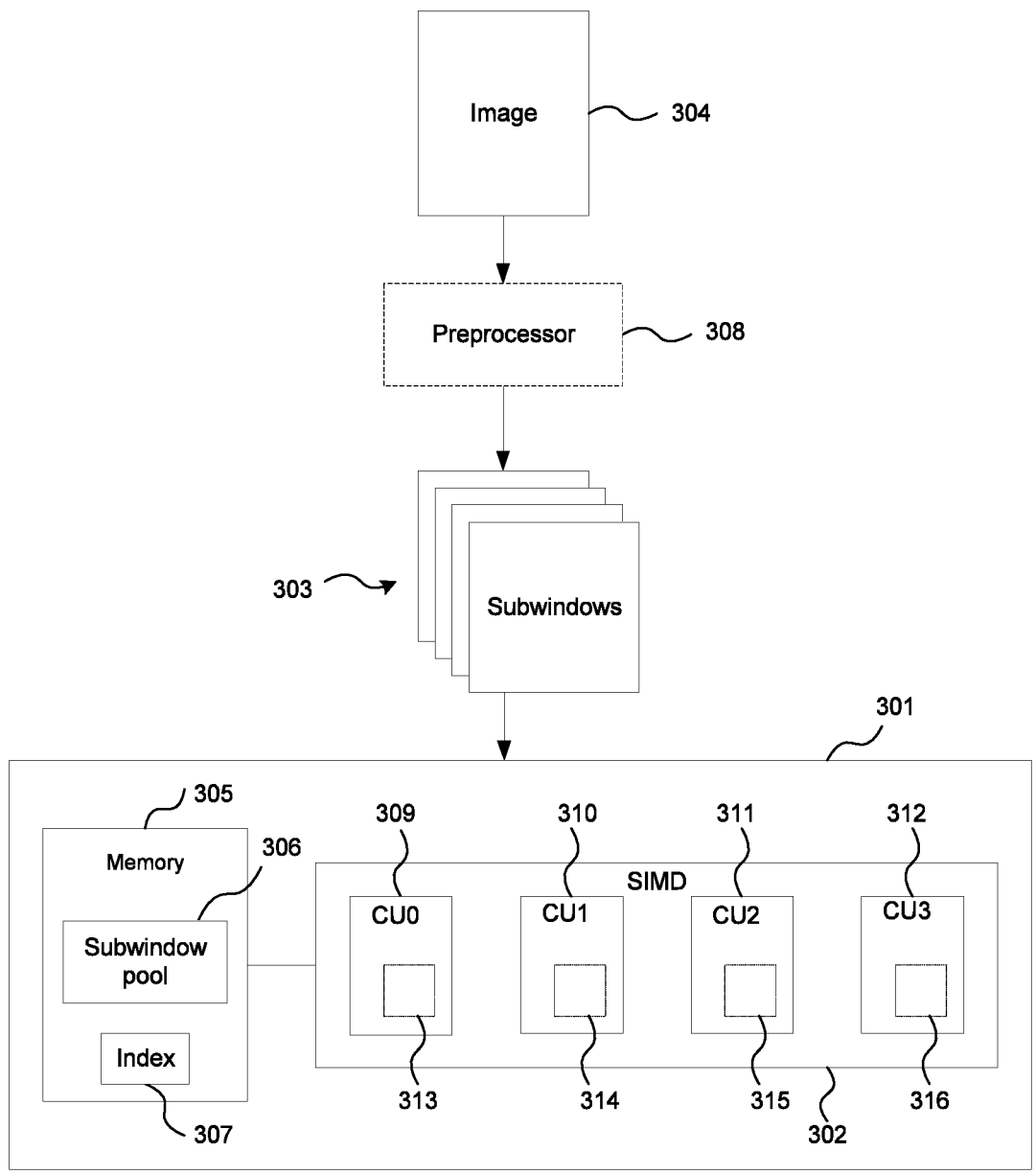
FIG. 3 is a schematic diagram of a processing unit adapted to perform object detection in parallel at a set of computation units.

A SIMD processing unit 301 for performing object detection in an image is illustrated in FIG. 3. The processing unit 301 could, in one example, be part of a graphics processing unit (GPU). In this example the object detection being performed is the detection of faces in subwindows 303 of an image 304. Each subwindow represents a region of the image. The processing unit 301 comprises a SIMD processor 302 having a plurality of computation units 309-312. In this example there are four computation units, but more generally there could be any number of computation units. The computation units collectively form a SIMD processor arranged to perform the same instructions in parallel (i.e. in "lockstep") on different data. The instructions performed by each of the computation units embody a sequence of classifier routines each configured to test one or more object features against a region of an image in which object detection is to be performed.

The processing unit 301 is configured to receive subwindows 303 which represent regions of an image 304 in which object detection is to be performed. Image 304 could for example be a frame from a digital camera pipeline, such as a still image frame or frame of a video stream. The image 304 could be a derivative of a source image in which objects are to be detected; for example, the image 304 could be a luma image pyramid as described below.

Figure 2:
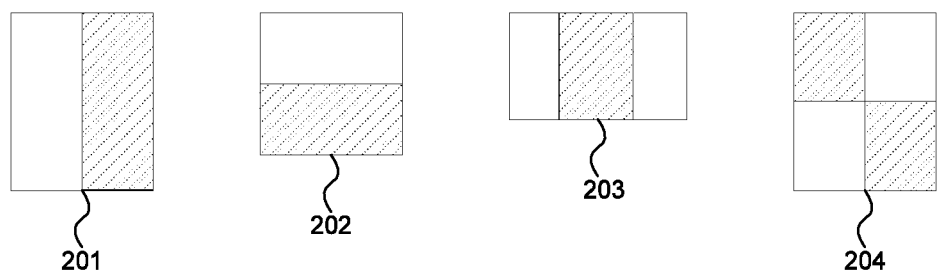
FIG. 2 shows four Viola-Jones feature types typically used in a cascade of classifiers.

The processing unit 301 is configured to perform object detection in the image by means of classifier sequences running in parallel at its computation units, with each classifier sequence operating on a different subwindow 303. Each classifier sequence tests for various image features in the subwindow allocated to it. The classifier sequence could be a Viola-Jones cascade of classifiers and the features could be object features of the type shown in FIG. 2. In this example the classifiers are binary classifiers: each binary classifier of the sequence is tested against a subwindow and the subwindow either passes or fails the test. More generally each classifier could be any suitable kind of classifier which yields any number of possible results, including ternary classifiers (which have three possible results).

Each of the classifier sequences performed at the computation units 309-312 of the SIMD processor 302 comprise identical instructions. In other words, each computation unit performs the same instructions but on different data. Each computation unit is arranged to operate on a different subwindow so that the subwindows to be searched are processed in parallel. The subwindows 303 may be generated for frame 304 in any suitable manner and in the example shown in FIG. 3 are stored at subwindow pool 306 accessible to the classifier routines running at the computation units. The subwindow pool 306 is in this example held at a memory 305 accessible to the processing unit, but more generally at least part of the subwindow pool could be held externally to the processing unit, such as at the memory of a graphics processing unit (GPU), and/or at a memory of a host system in which the processing unit is implemented.

Each subwindow represents a region of image 304 in which object detection is to be performed. Subwindows 303 could for example each carry a data portion derived from image 304 on which the classifier routines operate. Alternatively, the subwindows could be a reference (such as a pointer or memory address) into a representation of all or part of image 304 such that each subwindow identifies a region of image 304. For example, a subwindow could indicate one or more of: a set of coordinates, a measure of rotation, and a measure of size in image 304, from which the image region represented by the subwindow can be identified. All or part of the image 304 or a derivative thereof could be stored at memory 305 for access by the classifier routines.

A preprocessor 308 could optionally be provided for processing data representing image 304 into a form on which object detection can be efficiently performed. Such processing could include image and/or colour space transformations. In the example shown in FIG. 3, the preprocessor 308 is provided externally to the processing unit, such as at another processing entity of a GPU at which the processing unit is implemented. More generally the preprocessor could be provided at any suitable location, including at a host data processing system comprising the processing unit, or at the processing unit itself.

In face detection systems, it is generally the achromatic information in an image that is important; colour information is often less important and can be discarded for the purposes of face detection so as to reduce the image size and hence the processing resources required. For example, image 304 might be a high-resolution sRGB colour frame received from a camera pipeline. In order to reduce the size of the search space, the preprocessor 308 could be configured to scale the image to a lower pixel resolution (e.g. 640×480 pixels). Additionally or alternatively, the preprocessor could be configured to transform image 304 into another colour space, such as the YUV colour space whose Y-component (luma) carries the luminance information on which face detection is generally performed. In other examples, a custom colour space can be used.

It can be advantageous for preprocessor 308 to be configured to generate a luma image having a resolution that provides a balance between retaining sufficient detail to allow faces to be reliably identified in the image and limiting the search space to a size that can be searched within a desired timeframe (e.g. in real-time between frames provided by a camera pipeline). When detecting objects other than faces, it can be advantageous to process a received image so as to form images other than luma images. For example, if an object is known to be of a particular colour, a received frame could be processed so as to emphasize that colour and/or discard information relating to other colours which do not significantly aid in identifying the object.

Subwindows 303 could be defined for the processing unit 301 in any suitable manner, including being defined outside the processing unit (e.g. at preprocessor 308 as shown in FIG. 3) and provided to the processing unit, and being defined at the processing unit itself. Data defining aspects of the subwindows 303 (e.g. their position, size and angle with respect to some predetermined direction) could be provided to the processing unit together with or separately to data representing one or more regions of image 304 identified by the subwindows. The locations and size of subwindows 303 could be predefined for the processing unit. For example, a fixed set of image areas defined in terms of pixel coordinates could be held at subwindow pool 306 so as to enable the processing unit to identify each region of image 304 in which object detection is to be performed. Alternatively the subwindows could be generated for an image based on characteristics of the image (e.g. subwindows could be generated for locations in an image which are identified as potentially containing faces based on the colours or shapes at those locations).

Figure 6:
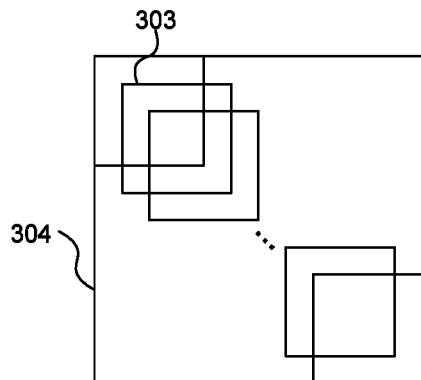
FIG. 6 illustrates subwindows of a given size at various locations within a frame.

Typically when using the Viola-Jones framework, a predefined set of subwindows are used for a (possibly rescaled) image of a given size in which object detection is to be performed. For example, for a 640×480 pixel image a set of subwindows can be generated ranging from a subwindow equal in size to the image, down to subwindows that are 20×20 pixels in size. Each subwindow of a given size can typically take many possible unique positions within the frame. For example, FIG. 6 shows a set of possible positions for a subwindow 303 along a diagonal of image 304. The total number of subwindows to be searched for a 640×480 source frame can be many hundreds of thousands. If subwindows of all possible rotations are also to be searched then it will be appreciated that the search space can get very large indeed.

Various techniques are used in the art to define a set of subwindows for an image of a given size which offers a good balance between object detection performance and the processing time required to search all of the subwindows of the set. Some techniques predefine an advantageous set of subwindows for a given working image size. Other techniques define different densities of subwindows for those areas of an image which appear likely to contain a face as compared to those areas of an image which appear unlikely to contain a face. The subwindows defined for a given image can therefore change as that image is processed.

In order to avoid aliasing problems, it can be advantageous to configure preprocessor 308 to process image 304 into an image pyramid or mipmap comprising the image at several different scales (typically as luma images). Object detection can then be efficiently performed in the image pyramid or mipmap at several different scales in a single pass by defining subwindows 303 for the image pyramid/mipmap as a whole. Techniques for forming image pyramids and mipmaps are well known in the art. For a 640×480 pixel luma image, an image pyramid having six levels has been shown to provide good performance, with the resolution at each level being a factor of two smaller than the level above (e.g. the image pyramid comprises luma images having dimensions $\frac{1}{1}$, $\frac{1}{2}$, $\frac{1}{4}$, $\frac{1}{8}$, $\frac{1}{16}$, $\frac{1}{32}$ of the size of the base luma image—in this case 640×480 pixels). Scaling factors other than two may be used, but a scaling factor of two is convenient since it matches the scaling factors commonly used in computer graphics, where an image pyramid is also known as a mipmap. In the case the processing unit is implemented in a GPU, lookups of pixel data from the image pyramid may be accelerated using a GPU's mipmap hardware.

The Viola-Jones framework calls for the image in which object detection is to be performed to be expressed in the form of an integral image in which a given pixel value at coordinate (x, y) is the sum of the pixel values in the rectangle defined by the corners (0,0) and (x−1, y−1). The preprocessor 308 could be configured to provide images or image pyramids/mipmaps expressed in the form of integral images. This substantially improves the efficiency of the Viola-Jones summation calculations performed in order to evaluate each binary classifier.

It will be appreciated by a person skilled in the art that a classifier sequence suitable for identifying an object in an image can be determined based on the visual characteristics of the object, such as the patterns of contrast the object typically provides in an image from various perspectives. Once a classifier sequence has been defined, suitable thresholds for use with the classifiers can be empirically determined so as to obtain a desired hit rate (correctly identifying an object) and/or miss rate (failing to identify an object). For example, a learning algorithm such as AdaBoost can be used with a set of test images to train classifiers and achieve the desired performance characteristics.

The Viola-Jones framework provides a suitable classifier sequence for detecting faces in an image in the form of a cascade of binary classifiers, but any classifier sequence for achieving object detection could be used. Under the Viola-Jones framework, the binary classifiers increase in complexity as the cascade progresses which has the advantage of initially rejecting a high number of subwindows whilst maintaining a high match rate should each classifier of the cascade pass a given subwindow.

As has been explained with respect to FIG. 1, evaluating subwindows in parallel at a conventional SIMD processor results in significant underutilization of the computation units. This is because for a given group of subwindows allocated to the processor, some of the classifier sequences running at the computation units of the processor terminate earlier than others (e.g. when one of the classifier sequences fails a feature test and rejects the subwindow), yet new cascades may not be started to evaluate new subwindows until all of the computation units have completed processing and the cycle of instructions running at the computation units of the processor can start again. At any given time during object detection processing at a conventional SIMD processor, a significant proportion of computation units are likely to be idle.

Figure 4:
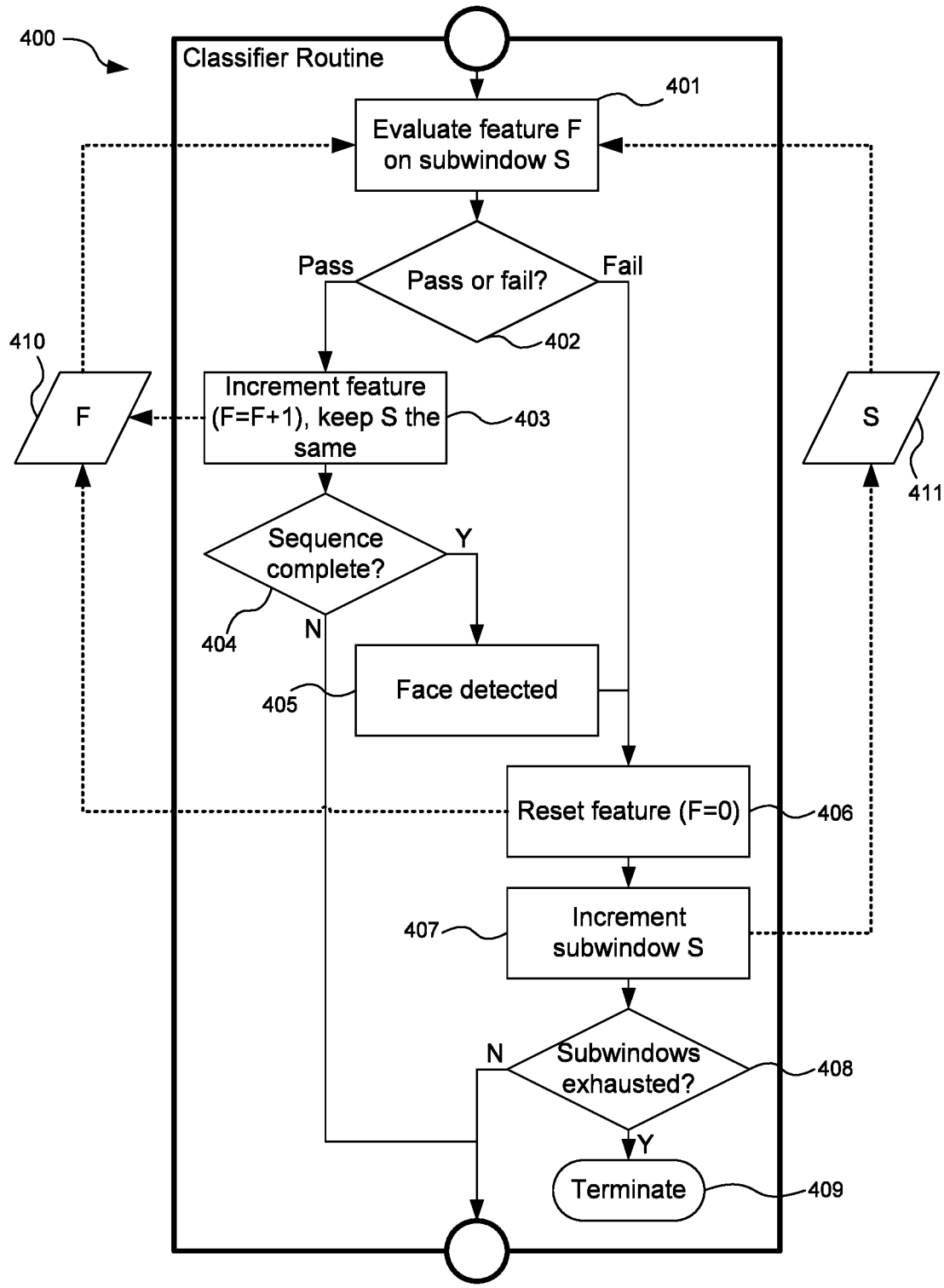
FIG. 4 is a flowchart illustrating the operation of a classifier routine operating at a computation unit of the processing unit shown in FIG. 3.
Figure 5:
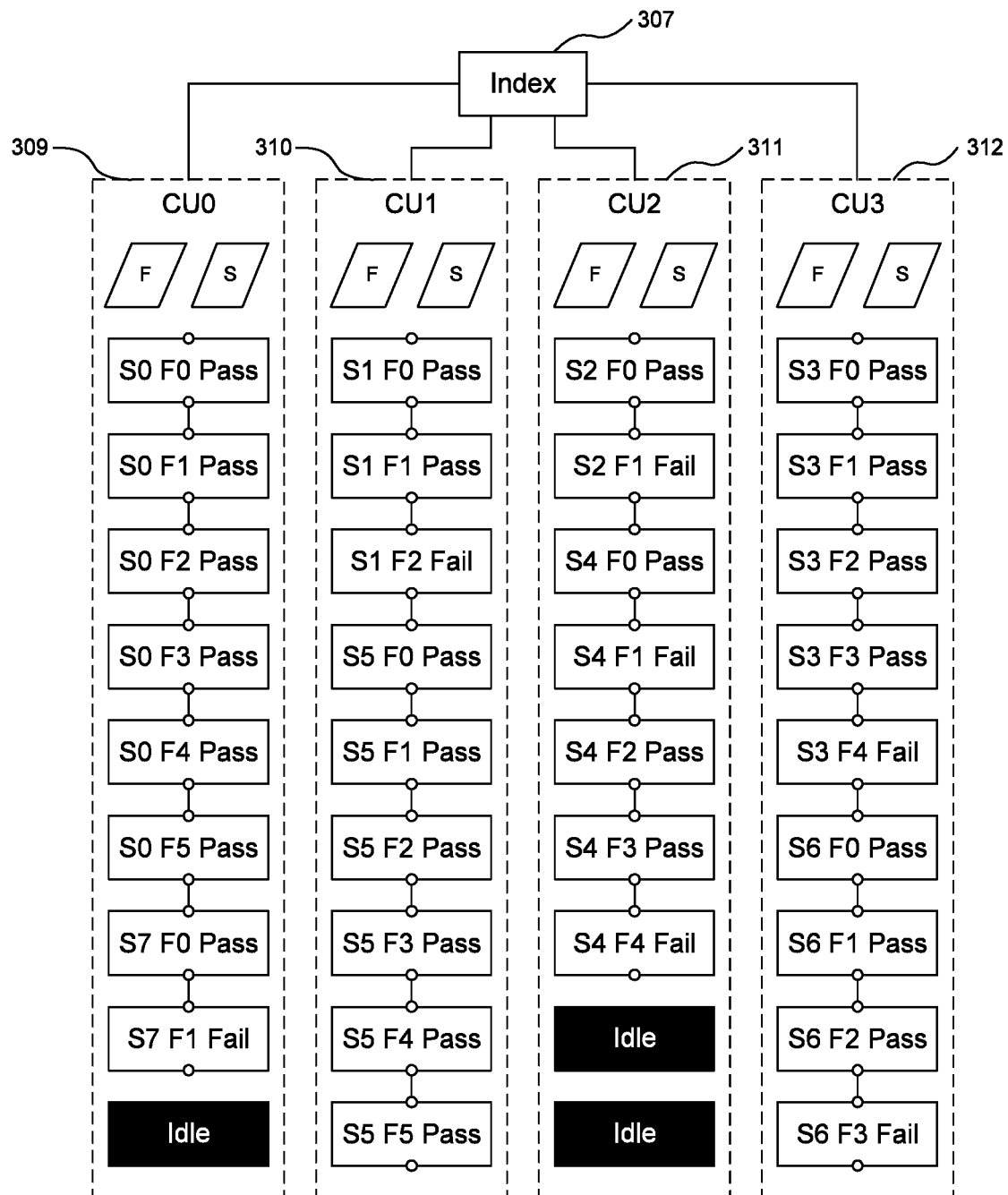
FIG. 5 illustrates the processing of cascades of classifiers at the computation units of the processing unit shown in FIG. 3.

Described below with reference to FIGS. 3, 4 and 5 is a technique for performing object detection on a SIMD processor that addresses this issue. In the processing unit 301 of FIG. 3, in parallel, each of the computation units 309-312 is configured to evaluate a classifier sequence against a subwindow. Each classifier sequence could comprise, for example, testing one or more features of the Viola-Jones framework against a subwindow. Performing the classifier sequence at a computation unit comprises running a plurality of classifier routines, each operable to test a subwindow for the presence of an object feature. Each of the computation units executes classifier routines which comprise identical instructions to the routines running at all the other computation units. Furthermore, each classifier routine is able to evaluate any object feature on any subwindow, meaning that the same classifier routine can be used at each stage of the classifier sequence, and on each computation unit in parallel. Because the same classifier routine comprising the same instructions is used to test any of the features in the classifier sequence at any of the computation units, the computation units of the SIMD processor can each test a different feature in the sequence at the same time. By providing different subwindows to each computation unit, the SIMD processor can also perform object detection in the subwindows in parallel. For example, a routine at computation unit 309 could test the 1st feature of the sequence against a first subwindow defined for an image, while in parallel a routine at computation unit 310 tests the 31st feature of the sequence against a second subwindow defined for an image.

The classifier routines are further configured to independently fetch new subwindows from subwindow pool 306 on completing processing of their current subwindow. This is achieved by (a) maintaining for each computation unit data defining the subwindow that computation unit is operating on and the image feature under test, and (b) including in the instructions defining the classifier routine an instruction to fetch a new subwindow once processing of the current subwindow has completed. Subwindows are therefore not allocated to computation units in groups as would be the case for a conventional SIMD processor. Instead each classifier routine running at each computation unit individually determines new subwindows to evaluate as and when they are required.

Each computation unit maintains data 313-316 defining the subwindow that computation unit is operating on and the object feature which is being tested by the classifier routine running at that computation unit. The location of data 313-316 is shown schematically in FIG. 3: the data could be held at the computation units, at memory 305, or at any other data store accessible to the classifier routines running at the computation units.

A routine can be configured to acquire new work from pool 306 when an object feature test fails for a subwindow against which it is evaluated or when the routine completes the classifier sequence. Because all of the computation units of the SIMD processor 302 are concurrently running a common set of instructions at every level of the classifier sequence, the set of computation units can be utilised continuously until the pool of subwindows 306 is exhausted and all of the subwindows 303 defined for image 304 have been searched. When the pool of subwindows is exhausted, no further subwindows can be provided to the computation units and object detection in image 304 is complete.

In order to keep track of which subwindows 303 have been searched by the computation units of the SIMD processor and which have not, an index 307 can be maintained in the form of a shared variable at memory 305 which is accessible to the routines running at the computation units 309-312. The index indicates the extent of the search through the pool of subwindows 306. Each classifier routine is configured to update the index on requesting or receiving a new subwindow from pool 306 so as to reflect that the extent of search through the subwindows has progressed. For example, each of the subwindows could be assigned an identifier, with the subwindows being processed in turn starting from the subwindow having the lowest value identifier and working upwards. By configuring each routine to increment the index each time it requests a new subwindow, the index represents the highest value identifier allocated for processing and hence indicates the subset of subwindows of the pool yet to be allocated to a routine for processing. It will be appreciated that this is just one of many possible examples of an index for maintaining an indication of the extent of the search through the set of subwindows of the frame.

So as to ensure the index represents the collective progress made by the computation units, the index is preferably incremented by each routine using an atomic instruction.

Atomically incrementing the index ensures that conflicts between writes by the routines at each of the computation units do not occur. Conflicts can otherwise happen because the SIMD processing can mean that more than one computation unit can attempt to modify the index at precisely the same time (as the instructions are the same and in lockstep on each computation unit). The index could represent the index of the next subwindow in pool 306 to be processed. When the index reaches the total number of subwindows in the pool of subwindows, the pool is exhausted. In other examples, the index indicating the extent of the search through the pool of subwindows could count down from the total number of subwindows to zero, or the incrementing/decrementing of the index could be by an amount other than 1. The index described herein represents just one mechanism suitable for keeping track of the extent of search through a pool of subwindows.

Memory 305 as shown in FIG. 3 is a schematic representation of a memory which may comprise one or more physical and/or logical parts located at different points of the processing unit 301 or at a data processing system at which processing unit 301 is supported. For example, memory 305 could include registers local to each computation unit, memory local to groups of computation units, global memory accessible to all of the computation units, and one or more memories provided externally to the processing unit, e.g. at a host data processing system. Data representing the pool of subwindows 306 and the index 307 could be distributed in any suitable manner at across the one or more parts of memory 305.

An example of the classifier routine running at each of the computation units 309-312 is shown below in pseudocode. F is an identifier of the particular feature in the classifier sequence which is being evaluated by the routine, S is an identifier of the subwindow which is being operated on by the routine, and R is a result returned by evaluating feature F against subwindow S (i.e. pass or fail). The values F and S are maintained for each computation unit at data 313-316. In this example there are 50 feature tests in the sequence (F=0 to 49) and 1000 subwindows in pool 306 to process at the SIMD processor 102.

At the start of the classifier sequence, the variables are initialised by setting F=0 and S=atomic_inc(workindex) such that each routine receives a different subwindow and begins evaluating the first feature. The instruction "atomic_inc(workindex)" performs an atomic increment of index 307, with the parameter workindex starting at zero such that when the classifier routines running on the computation units call "atomic_inc(workindex)" one of the routines receives subwindow 1, another routine receives subwindow 2, etc. In other words, although all the classifier routines running on the computation units all simultaneously request a subwindow identifier, the atomic increment function handles this contention and ensures that all the classifier routines are allocated different subwindows.

Each of the routines then concurrently perform the following instructions in lockstep:
 i. R=eval(F, S)
 ii. if(R==1) F=F+1
 iii. if(F==50) {faceFoundAt(S);}
 iv. if(F==50 OR R==0) { F=0; S=atomic_inc(workindex);
    if(S>=1000) return;}

Line (i) evaluates feature F against subwindow S, with the routine using index S to identify the subwindow in pool 306 which is to be evaluated. Line (ii) causes the routine to move onto the next feature in the sequence if the evaluation returns a "pass" (R=1). Line (iii) checks whether the last feature in the sequence (number 49) has been evaluated successfully (only then can F have a value of 50); if so an object candidate has been found in the subwindow being processed and the routine calls the output function "faceFoundAt(S)". Line (iv) determines whether a face was detected (F==50) or an evaluation failed (R==0). If so the routine is then re-initialised so as to start processing the next subwindow in the pool from feature zero. If the pool of subwindows is exhausted the thread terminates processing. In this manner, the same set of instructions (i)-(iv) above are performed in order to evaluate any feature of the sequence against any subwindow of the pool and iterated so as to work through the features for each subwindow and through the available subwindows.

The operation of the above exemplary classifier routine is also illustrated in the flowchart of FIG. 4. At 401, classifier routine 400 evaluates feature F and subwindow S according to the values for F and S maintained at 410 and 411 by the routine. If the feature passes at step 402, value F 410 is incremented at step 403 and the routine checks at 404 to see whether the classifier sequence has been completed for the subwindow. If all of the features of the sequence have been evaluated and pass, the routine returns that the face has been detected at 405; if not, the routine is iterated so as to continue on to evaluate the next feature against the current subwindow. When either a feature fails or a face is detected, the feature value F is reset at 406 so as to identify the first feature in the sequence, the subwindow value S is incremented 407, and a check is performed to determine whether the pool of subwindows has been exhausted 408. Once the pool of subwindows has been exhausted the routine terminates, otherwise the routine is iterated so as to continue to evaluate features against subwindows according to the values of F and S maintained at 410 and 411.

A simple example of the improved efficiency of SIMD processor 302 over conventional SIMD processors is shown in FIG. 5. In this example, the pool of subwindows comprises eight subwindows S0 to S7 and the classifier sequence includes six feature F0 to F5. Each of the computation units 309 to 312 of SIMD processor 302 runs a classifier routine according to the principles described above and keeps track of the extent of processing through the pool of subwindows by means of index 307. In this example, features F0-F5 shown in FIG. 5 are the same as features F0-F5 from FIG. 1, and subwindows S0-S7 are the same as subwindows SW0-SW7 shown in FIG. 1. The result of the evaluation of each given feature and subwindow pair is therefore the same in FIGS. 1 and 5.

On initialisation, the four computation units receive the first four subwindows S0-S3 (e.g. from the atomic operation on the index) and begin evaluating the first feature F0 of each sequence. The routines running at each of the computation units then proceed to operate in the manner described herein. Subwindows are not allocated in groups to the computation units; new subwindows are instead requested as and when they are required by the routines running at the computation units. For example, it can be seen that the routine running at computation unit 311 is the first to receive a new subwindow when subwindow S2 fails the second feature F1. Computation unit 311 then immediately begins evaluating the classifier sequence against the next available subwindow from the pool, S4. Subwindow S4 later fails evaluation of the fifth feature F4 at computation unit 311. At that point all of the subwindows of the pool have been exhausted and the routine running at computation unit 311 terminates, leaving the computation unit idle for two iterations of the routines running in parallel at the SIMD processor 302.

In FIG. 5, all eight of the subwindows of the pool are processed by processing unit 301 with only 3 out of a total of 36 iterations of the routines running at the computation units being idle. This equates to idle time at the computation units of around 8%, which is far lower than the over 30% idle time experienced by the computation units of a conventional SIMD processor when evaluating the same features against the same subwindows. It will be appreciated that processing unit 301 can perform object detection in parallel at its computation units with substantially greater efficiency than is possible with SIMD processors configured in a conventional manner.

Due to the presence of instructions to check whether new subwindows are required and maintain data identifying the current subwindow and feature for each routine, there is a small overhead present in each iteration of the routines performed at the computation units of SIMD processor 302. Such an overhead is not present in the operation of conventional SIMD processors which are allocated groups of subwindows for processing. The negative effect on performance as a result of this overhead is however substantially smaller than the positive effect on performance resulting from the far lower proportion of idle time experienced by the computation units of SIMD processor 302 as compared to a conventional SIMD processor.

Index 307 has been described above as a shared variable accessible to all of the computation units of the processing unit. Such variables can however be slow to access when there are a large number of routines potentially competing for access to the variable (e.g. many more than the four routines described in the examples above) and/or the variable is held at a global memory of a GPU or at the memory of a host data processing system. In order to address these issues, it can be advantageous to divide up the pool of subwindows 306 into a plurality of subsets of subwindows and logically group the computation units of a SIMD processor such that each subset of subwindows is processed by a different group of computation units. There could be many more subsets of subwindows than there are groups of computation units. By allocating the subsets of subwindows to the groups of computation units, the above problems can be alleviated. One exemplary way of doing this is shown in FIG. 7.

Figure 7:
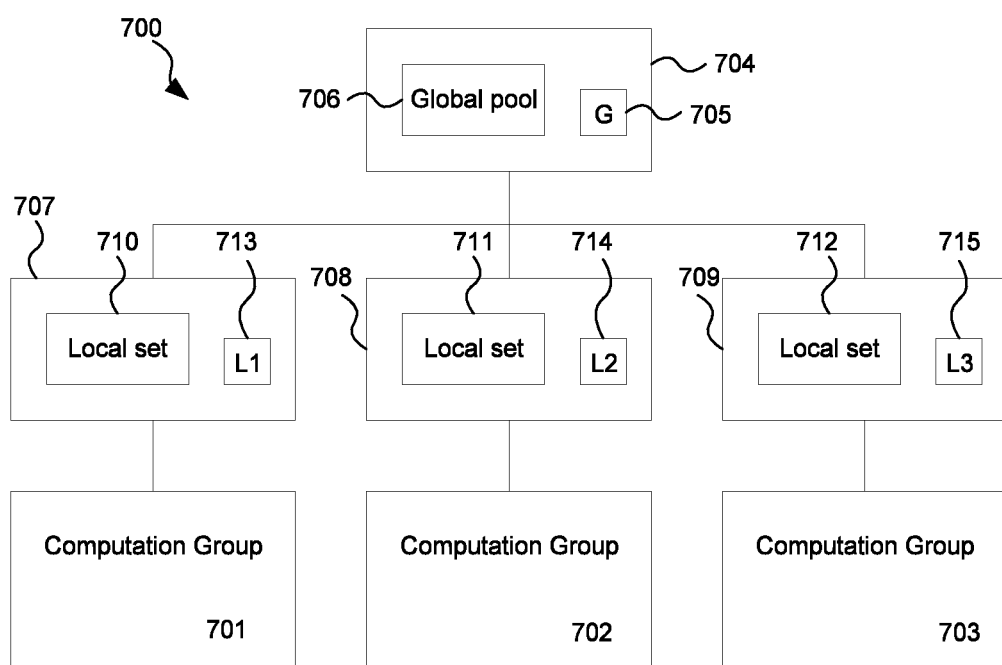
FIG. 7 is a schematic diagram of a processing unit adapted to perform object detection in parallel at a plurality of groups of computation units.

A SIMD processing unit 700 which is configured to make use of groups of SIMD computation units is shown in FIG. 7, three groups of computation units 701-703 are shown, each of which can include any number of computation units of a SIMD processor. The computation units could belong to one or more different SIMD processors—for example, each group of computation units could be a SIMD processor configured in the same way as SIMD processor 302 in FIG. 3. Each computation unit executes a classifier routine configured to operate in the manner described above.

Each group of computation units (or "computation group") has a respective local memory 707-709 which the routines running at the computation units of the group can access at lower latency than a global memory 704 to which all of the computation groups have access. The local memory of a given computation group could be accessible to that computation group but not to other computation groups. In the example of FIG. 7, each local memory includes a local subset of subwindows 710-712 for the computation group (which may be in the form of references to parts of the image, image region identifiers, or image data itself) and a local index 713-715 indicating the extent of search through that subset of subwindows. In another example, each local memory stores only the local index, and the subsets of subwindows are stored elsewhere (such as in memory external to the processing unit or in global memory). The classifier routines running at the computation units of a group process the subwindows of its respective subset and individually request new subwindows from that set in the manner described above with respect to FIGS. 3-5.

The computation groups could each represent a processing unit 301 as shown in FIG. 3. For example, computation group 701 could be SIMD processor 302, local memory 707 could be memory 305, local set 710 could be subwindow pool 306 and local index 713 could be index 307. In the arrangement shown in FIG. 7 however, the subset of subwindows operated on by computation group 707 would represent only part of the total pool of subwindows defined for an image 304.

Each computation group independently works through its subset of subwindows. When a computation group exhausts its subset of subwindows, a new subset of subwindows is allocated to the computation group from a global pool of subwindows 706 held in global memory 704. This could be achieved in any suitable fashion, including by monitoring each of the local indices 713-715 to determine when the respective local subset of subwindows has been exhausted and causing a new subset of subwindows to be written to the appropriate local set 710-712. Such monitoring could, for example, be performed by a process running at a GPU implementing the computation groups. In another example, the classifier routines running at the computation units of the groups are provided with a further instruction to, on the local subset of subwindows being exhausted, request a new subset of subwindows from global memory 706.

For example, step (iii) of the classifier routine described in pseudocode above could be modified to, instead of terminating, request that a new subset of subwindows is allocated to the computation group. The respective local index would also be reset or updated to enable the index to begin counting through the subwindows in the new subset. Global memory 706 could comprise a global index 705 indicating the extent of search through the global pool of subwindows for the image in which object detection is to be performed. A classifier routine could cause a new subset of subwindows to be written to its local memory by updating the global index 705 using an atomic instruction performed in response to its local subset of subwindows being exhausted. The atomic instruction could serve to both increment the global index to reflect the extent of search through the pool of subwindows and to cause the writing of the new subset of subwindows to the local memory. When the global index indicates the global pool of subwindows has been exhausted, no further sets of subwindows can be provided for processing and the routine performing the atomic instruction can at that point terminate.

Although accesses to global memory by a routine are slower than to local memory, these accesses are infrequent because they only occur when a subset of subwindows has been exhausted. Furthermore, since any routine can request that a new subset of subwindows is written to local memory at the point the current set becomes exhausted, the routines running at the computation units of each group can be continuously occupied.

In the example that the processing unit is implemented on a GPU, then an API such as OpenCL may be used to provide the classifier routines, and the computation units may be threads running on the GPU. OpenCL enables threads to be grouped into "workgroups", and workgroups can each be provided with local memory that is accessible only to that workgroup. OpenCL also enables global memory to be provided that is accessible to all threads and workgroups, but this is slower to access than local memory. The architecture of GPUs (and some CPUs) also tend to be arranged such that they have multiple sets of grouped computation units, which may be in the form of multiple cores or compute clusters. The separate cores or clusters do not share local memory, and hence cannot access the same data in fast local memory. Some memory may be provided that can be accessed by all the cores or clusters, but this is more remote from the cores/clusters and not as fast to access. Therefore, the computation groups described above can be configures such that they correspond to the cores/clusters of the device, enabling fast access to the data local to the cores/clusters, and slower access to the data shared between all computation groups, but which is less frequently needed.

In some examples, the pool of subwindows can be divided into subsets such that the subwindows of each subset refer to some common area of the image in which object detection is to be performed (or a derivative thereof, such as an image pyramid or mipmap). This minimises the image data which is copied into local memory for the classifier routines to operate on and improves the efficiency of any caching processes in operation at the local memory of each computation group.

In an alternative example to that described above with reference to FIG. 7, the assignment of subsets of subwindows to computation groups can be partially handled by the scheduling system of the SIMD processor itself. For example, some SIMD processors (such as GPUs and some CPUs) have multiple computation units operating in a SIMD fashion, and the programs running on these computation units are in the form of threads. These SIMD processors are generally able to have more threads in the system than there are computation units. In other words, not all threads can be executed at the same time. Instead, the SIMD processor can switch between threads as and when resource becomes available (e.g. if one thread becomes idle, then it is switched out and another switched in).

In such cases, the subwindows can be divided into subsets, as above, and each subset can be allocated to a group of threads. There will be more groups of threads than there are computation groups on the processing unit. The processing unit will start executing as many of the thread groups as possible, and as soon as one of these thread groups finishes evaluating its subset of subwindows then it will be switched out and replaced with another thread group allocated a different subset of subwindows. In this way, all the subsets of subwindows will be evaluated, and the use of global memory is avoided. However, this does instead rely on the thread scheduling of the processing unit, which is more specific to the individual processing unit performing the object detection.

Object detection as performed in accordance with the principles described herein is useful in many types of devices. In particular, the locations of subwindows which pass as face candidates can be prioritized by the autofocus system of a camera pipeline as autofocus points with the aim of ensuring that the faces in an image are in focus. Detected face information can be used in video encoding apparatus to inform the encoder as to the location of faces in the video stream and permit the improvement of apparent quality of the encoded video by preferentially increasing the encode quality of the faces in the video stream. Detected face information can be provided as metadata for photographs captured by a camera so as to indicate the locations of faces in the photo.

The SIMD processing units described herein could be used to perform object detection in the camera pipeline of, for example, a digital camera, smartphone, tablet computer, or any other kind of device that includes a camera, such as a security camera. More generally, the SIMD processing units could receive frames from any suitable source, including from a storage subsystem providing a recorded video stream or a series of one or more digital images, or from a communication subsystem providing a received video stream or series of one or more digital images.

On some platforms providing SIMD processors, an image may be divided up into tiles for processing (e.g. for processing at certain kinds of GPUs). It will be apparent to the skilled person that the principles of performing object detection described herein can be readily extended to an image expressed as a set of tiles each having a defined set of subwindows.

The terms software, routine and program code can include executable code for processors (e.g. CPUs and/or GPUs), firmware, bytecode, programming language code such as C or OpenCL, and modules for reconfigurable logic devices such as FPGAs. Machine-readable code can include software/program code, as well as code for defining hardware representations of integrated circuits at any level, including at register transfer level (RTL), at high-level circuit representations such as Verilog or VHDL, and lower-level representations such as OASIS and GDSII.

The term SIMD processor shall be understood to refer to any kind of processor operable to perform the same instructions in parallel on different data and includes single instruction, multiple thread (SIMT) processors and other variants. The computation units described herein form part of or can be aggregated to represent one or more SIMD processors. The computation units could be provided by any suitable processing entity, including one or more of a CPU, a GPU, or fixed function or programmable hardware. Software and routines could be stored in non-transitory form at a machine readable medium such as an integrated circuit memory, or optical or magnetic storage. A machine readable medium might comprise several memories, such as on-chip memories, computer working memories, and non-volatile storage devices.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A single-instruction, multiple data processing unit for performing object detection in an image by testing for a plurality of object features in a plurality of image regions, the processing unit comprising:
   a set of computation units operable to execute a plurality of classifier sequences in parallel, each classifier sequence comprising a plurality of classifier routines, and each classifier routine comprising identical instructions to the other classifier routines in each of the plurality of classifier sequences;

wherein the computation units are configured to concurrently test different features against different image regions using data identifying an image region and a feature under test;

wherein each classifier routine is configured to pass or fail an image region on testing an identified feature against the identified image region; and a memory accessible to the set of computation units and arranged to store an index representing an extent of search through the plurality of image regions and each classifier routine comprising instructions configured to, on failing an image region, update the data at which the classifier routine is executing by atomically incrementing the index so as to update the extent of search and cause an identifier of a next image region to be returned to the classifier routine.

2. A single-instruction, multiple data processing unit as claimed in claim 1, each classifier sequence being configured to perform a sequence of tests for object features in an image region, each classifier routine of the classifier sequence being configured to perform a test of the sequence.

3. A single-instruction, multiple data processing unit as claimed in claim 1, each classifier routine comprising instructions configured to:
   on passing an image region, update the data at which the classifier routine is executing so as to cause the next classifier routine in the classifier sequence to test the next feature against the same image region;
   on failing an image region, update the data at which the classifier routine is executing so as to cause the next classifier routine in the classifier sequence to test the first feature against the next image region.

4. A single-instruction, multiple data processing unit as claimed in claim 1, each classifier routine being configured to use its data identifying an image region to lookup data from that identified image region in the image in which object detection is being performed.

5. A single-instruction, multiple data processing unit as claimed in claim 1, each classifier routine of a classifier sequence being a single routine arranged to execute iteratively at its computation unit so as to test the identified feature against the identified region and update the data.

6. A single-instruction, multiple data processing unit as claimed in claim 1, further comprising a further set of computation units operable to execute the plurality of classifier sequences, wherein the set of computation units forms a first computation group and the further set of computation units forms a second computation group, and wherein the plurality of image regions are divided into a plurality of subsets of image regions, and each of the first and second computation group is allocated a different one of the subsets of image regions to test.

7. A single-instruction, multiple data processing unit as claimed in claim 6,
   wherein the processing unit further comprises a global memory storing a global index representing an extent of search by the first and second computation groups through the plurality of subsets of image regions;
   wherein each classifier routine comprises instructions configured to, on exhausting the subset of image regions for its associated computation group, cause a new subset of image regions to be allocated to the associated computation group in dependence on the global index.

8. A single-instruction, multiple data processing unit as claimed in claim 7, each classifier routine comprising instructions configured to cause the global index to allocate a new subset of image regions to the associated computation group by atomically updating the global index so as to update the extent of search through the plurality of subsets of image regions, and cause an identifier of the next subset of image regions to be returned to the classifier routine.

9. A single-instruction, multiple data processing unit as claimed in claim 6, further comprising a memory accessible to the first computation group but not to the second computation group, the memory being arranged to store an index representing an extent of search by the first computation group through the plurality of image regions;
   wherein each classifier routine of the first computation group is configured to pass or fail an image region on testing the identified feature against the identified image region and comprises instructions configured to, on failing an image region, update the data at which the classifier routine is executing by atomically incrementing the index so as to update the extent of search and cause an identifier of the next image region to be returned to the classifier routine.

10. A single-instruction, multiple data processing unit as claimed in claim 1, each image region differing from other image regions in terms of one or more of its position, size and orientation in the frame.

11. A single-instruction, multiple data processing unit as claimed in claim 1, each object feature being a Haar-like feature and each classifier routine being configured to determine whether the feature meets a predefined threshold.

12. A method for performing object detection in an image at a single-instruction, multiple data processor having a set of computation units arranged to execute a plurality of classifier sequences in parallel, each classifier sequence comprising a plurality of classifier routines having identical instructions to the other classifier routines in each of the plurality of classifier sequences, and the method comprising:
   executing a classifier routine of each sequence in parallel at each of the set of computation units so as to test for a plurality of object features in a plurality of image regions such that the computation units are configured to concurrently test different features against different image regions using data identifying an image region and a feature under test;
   wherein, on testing an identified feature against an identified image region, passing or failing the identified image region; and
   maintaining an index representing an extent of search by the set of computation units through the plurality, of image regions, and each classifier routine, on failing an image region, updating the data identifying the image region and the feature under test by atomically incrementing the index so as to update the extent of search and cause an identifier of the next image region to be returned to the classifier routine.

13. A method as claimed in claim 12, each classifier routine:
   on passing the image region, updating the data identifying the image region and the feature under test so as to cause the next classifier routine in the classifier sequence to test the next feature against the same image region; or
   on failing the image region, updating the data identifying the image region and the feature under test so as to cause the next classifier routine in the classifier sequence to test the first feature against the next image region.

14. A method as claimed in claim 12, comprising iteratively executing each classifier routine at its computation unit so as to test the identified feature against the identified region and update the data.

15. A method as claimed in claim 12, each classifier routine executing at a computation unit of one of a plurality of groups of computation units and the method further comprising:
dividing the plurality of image regions into a plurality of subsets of image regions; and
allocating a different one of the subsets of image regions for testing at each group of computation units.

16. A method as claimed in claim 15, further comprising:
maintaining a global index representing an extent of search by the plurality of groups of computation units through the plurality of subsets of image regions; and
on a classifier routine exhausting the subset of image regions for its associated computation group, causing a new subset of image regions to be allocated to the associated computation group in dependence on the global index.

17. A method as claimed in claim 16, each classifier routine causing a new subset of image regions to be allocated to the associated computation group by atomically updating the global index so as to update the extent of search through the plurality of subsets of image regions and cause an identifier of the next subset of image regions to be returned to the classifier routine.

18. A non-transitory computer readable storage medium having stored thereon computer readable instructions that, when executed at a computer system comprising a single-instruction, multiple data processor, cause the computer system to perform a method for performing object detection in an image at the single-instruction, multiple data processor having a set of computation units arranged to execute a plurality of classifier sequences in parallel, each classifier sequence comprising a plurality of classifier routines having identical instructions to the other classifier routines in each of the plurality of classifier sequences, the method comprising:
executing a classifier routine of each sequence in parallel at each of the set of computation units so as to test for a plurality of object features in a plurality of image regions such that the computation units are configured to concurrently test different features against different image regions using data identifying an image region and a feature under test;
wherein, on testing an identified feature against an identified image region, passing or failing the identified image region; and
maintaining an index representing an extent of search by the set of computation units through the plurality of image regions, and each classifier routine, on failing an image region, updating the data identifying the image region and the feature under test by atomically incrementing the index so as to update the extent of search and cause an identifier of the next image region to be returned to the classifier routine.

* * * * *